United States Patent
Post et al.

(10) Patent No.: US 12,289,567 B2
(45) Date of Patent: Apr. 29, 2025

(54) METHOD OF IMAGE GATHERING IN MULTI-PROJECTOR SYSTEMS

(71) Applicant: CHRISTIE DIGITAL SYSTEMS USA, INC., Cypress, CA (US)

(72) Inventors: Matthew Post, Brampton (CA); Peter Anthony Van Eerd, Guelph (CA); Anda Achimescu, Kitchener (CA); Huck Kim, Waterloo (CA)

(73) Assignee: CHRISTIE DIGITAL SYSTEMS USA, INC., CA (US)

( * ) Notice: Subject to any disclaimer, the term of this patent is extended or adjusted under 35 U.S.C. 154(b) by 87 days.

(21) Appl. No.: 17/943,640

(22) Filed: Sep. 13, 2022

(65) Prior Publication Data

US 2024/0089418 A1  Mar. 14, 2024

(51) Int. Cl.
*H04N 9/31* (2006.01)
*H04N 13/254* (2018.01)

(52) U.S. Cl.
CPC ........... *H04N 9/317* (2013.01); *H04N 9/3147* (2013.01); *H04N 9/3179* (2013.01)

(58) Field of Classification Search
None
See application file for complete search history.

(56) References Cited

U.S. PATENT DOCUMENTS

| 6,755,537 | B1 | 6/2004 | Raskar et al. |
| 6,834,965 | B2 | 12/2004 | Raskar et al. |
| 2011/0234920 | A1 | 9/2011 | Nelson |
| 2013/0076789 | A1 | 3/2013 | Majumder et al. |
| 2019/0104242 | A1* | 4/2019 | Wippermann ......... H04N 23/67 |
| 2020/0404243 | A1* | 12/2020 | Saphier ................... G01B 11/25 |
| 2023/0089148 | A1* | 3/2023 | Dai ......................... G06V 20/17 382/103 |

FOREIGN PATENT DOCUMENTS

EP  3547260 A1  10/2019

OTHER PUBLICATIONS

Sajadi, Behzad et al. "Automatic registration of multi-projector domes using a single uncalibrated camera." In Computer Graphics Forum, vol. 30, No. 3, pp. 1161-1170. Oxford, UK: Blackwell Publishing Ltd, 2011.
Tehrani, Mahdi Abbaspour et al. "Automated Geometric Registration for Multi-Projector Displays on Arbitrary 3D Shapes Using Uncalibrated Devices." IEEE Transactions on Visualization & Computer Graphics 27.04 (2021): 2265-2279.

* cited by examiner

*Primary Examiner* — Samuel D Fereja
(74) *Attorney, Agent, or Firm* — PERRY + CURRIER INC.

(57) ABSTRACT

A method is provided of parallel gathering of structured light patterns in multi-projector systems, comprising sequentially projecting images from each of a plurality of projectors on a surface; capturing the sequentially projected images on the surface via at least one sensing device; creating one or more sensing device/projector masks for limiting the images projected by each of the plurality of projectors to portions that do not conflict with images projected by other ones of the plurality of projectors; using the one or more projector masks to create a graph of projectors whose projections conflict; and creating from the graph a plurality of gather groups wherein projectors within a group do not conflict with each other for simultaneously gathering structured light patterns from projectors in each of the gather groups.

12 Claims, 9 Drawing Sheets

METHOD OF IMAGE GATHERING IN MULTI-PROJECTOR SYSTEMS

BACKGROUND OF THE INVENTION

1. Field of the Invention

The present invention is directed to multi-projector systems, and in particular to a method of parallel gathering of structured light patterns in multi-projector systems.

2. Description of the Related Art

Structured light systems are known for projecting a pattern (often grids or horizontal bars) that deforms when projected on a surface, and a vision system, including at least one sensing device such as a camera, to calculate the depth and surface information of the pattern for projector calibration. In a multi-projector system, structured light is gathered from the projectors sequentially, which causes the total gather time to be directly proportional to the number of projectors, as well as the number of cameras. Current structured light systems are not capable of quickly calibrating very large multi-projector systems. For example, a fifteen second gather sequence for each projector in a three hundred projector system would require seventy five minutes to sequential gather structured light from all projectors, which is an unacceptably long 'down time' for customers, developers, and installers trying to troubleshoot the system.

SUMMARY OF THE INVENTION

It is an aspect of the present invention to provide a method of unambiguous parallel gathering of structured light patterns in multi-projector systems without conflating which patterns come from which projectors, thereby addressing a fundamental bottleneck of gathering images for large-scale multi-projector systems.

Projectors in a multiple-projector system can be in conflict due for example to overlaps or non-distinct patterns, etc. Although overlapping can be one type of conflict, overlapping is not always a conflict. For example, three projectors can overlap but not conflict if different primary colors are used for each projector (i.e. red/green/blue) because a camera can disambiguate the patterns from each projector. Nonetheless, overlap is the conflict over which there is least control. Although distinct patterns and colors, etc., can be assigned to help identify and lower conflicts, the overlaps themselves are predetermined by the projector arrangement.

In one aspect, a method is set forth for finding conflicts by capturing projected images using one or more sensing devices, or by using other information (installation design information, previous calibrations, etc.) and then reducing these conflicts by varying the assignment of patterns/colours, separating/disambiguating patterns/projectors within an image by various masks, colors, distinct patterns, etc. and then simultaneously gathering images based on the reduced conflicts.

As discussed below, a process is set forth to determine an overlap graph for identifying "first round" conflicts. Based on that, colors and patterns can be assigned to projectors to reduce the conflicts (e.g. two projectors may overlap, but not be in conflict because they are assigned separate colors). Then, the reduced conflict graph can be resolved into a small number of non-conflicting groups that can be gathered at the same time.

In one aspect, cameras can use masks to differentiate between projectors that do not overlap. In other aspects, the patterns used can be distinct per projector, such as by the shape of the patterns (such as patterns similar to qr-codes that are different for each projector, or one projector using squares, another using triangles, etc.), and/or distinct colors can be used per projector (i.e. one that projects patterns in red, another in blue, etc.) or the timing of the patterns can be distinct (including, but not limited to, subliminal timing in the DMD bit planes) or otherwise, such that the projection from each projector can be differentiated and identified by the patterns (or partial patterns).

In some embodiments, parallel gathering of images for large-scale multi-projector systems can include a) selectively masking camera images, b) decomposing the layout of projectors into a graph of projectors that conflict due for example to overlaps or non-distinct patterns, etc., with each other and therefore cannot be gathered at the same time), c) determining the best gather groups (graph coloring) of the layout, d) separating a single camera image into an image per projector based on masks and patterns, and/or e) running gather processes in parallel across groups of projectors.

The above aspects can be attained by a method of parallel gathering of projected images projected on a surface in a multi-projector system having a plurality of projectors, comprising: creating one or more masks for limiting capture by at least one sensing device of the projected images projected by each of the plurality of projectors to portions that do not overlap with projected images projected by other ones of the plurality of projectors; using the one or more masks to determine a graph of projectors whose images conflict; creating from the graph a plurality of gather groups of projectors whose images do not conflict; and simultaneously gathering images from projectors in each of the gather groups.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

In this description, the term "graph" is used to denote any mathematical relationship between multiple projectors or between multiple projectors to one or more sensing devices. Examples of graphs include, but are not limited to tables, a data structures, Boolean true/false statements, matrices, lists of projectors and sensing devices, etc., to describe the mathematical relationship prior to simultaneous gather of projected images, as discussed below.

Figure 1:
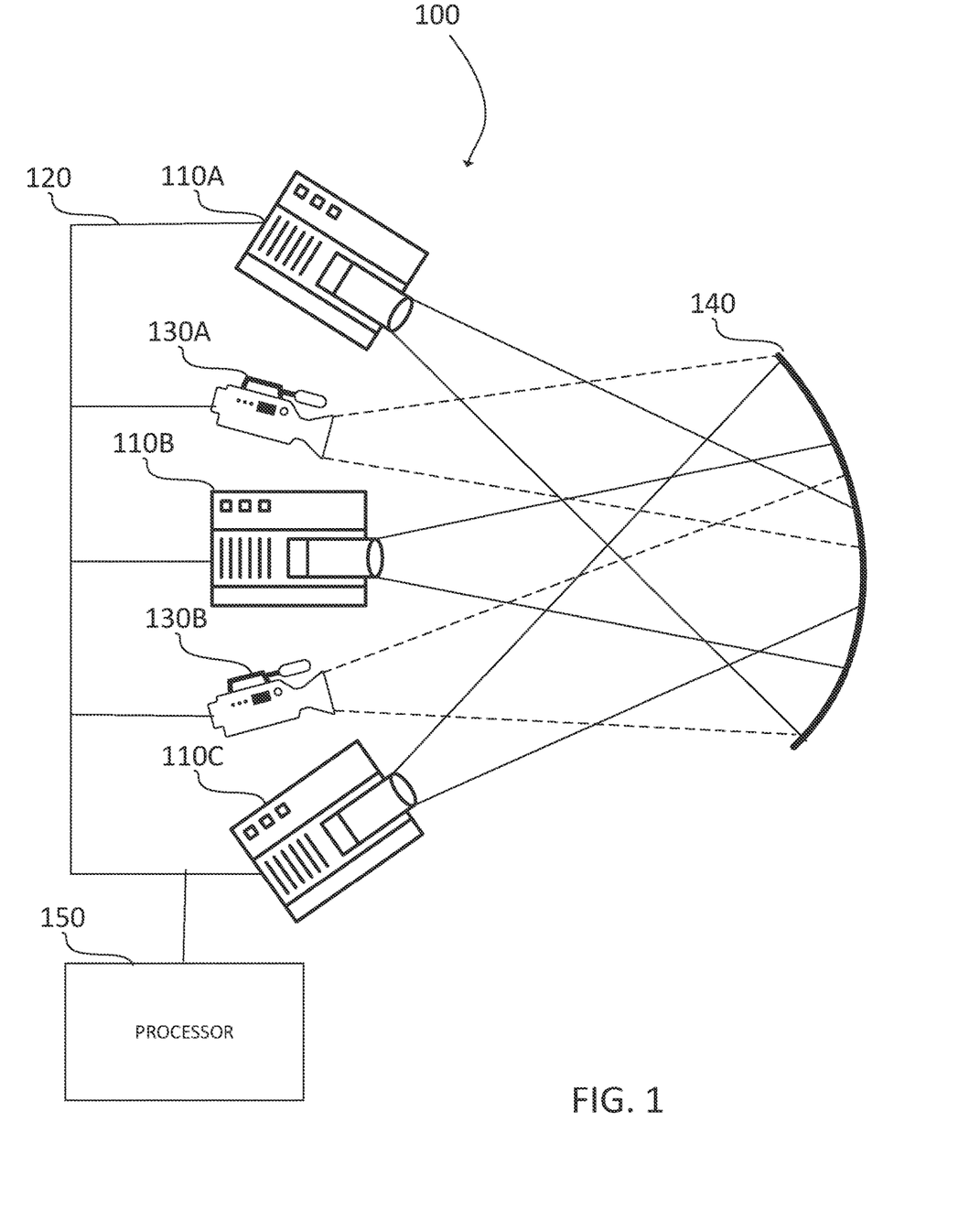
FIG. 1 is a block diagram of a multi-projector system according to an aspect of this specification.

FIG. 1 is a block diagram of a multi-projector system 100 according to an aspect of this specification. A plurality of projectors 110A, 110B, 110C, etc. are arranged in a self-configurable ad-hoc networked cluster and communicate with each other via a network 120, such as wireless Ethernet, RF, or infrared, under control of a processor 150. A person of skill in the art will appreciate that processor 150 can include at least one processing element, typically a central processing unit (CPU) in the form of a microprocessor, along with some type of computer memory, typically semiconductor memory chips. The processing element carries out arithmetic and logical operations, and a sequencing and control unit can change the order of operations in response to stored information. Peripheral devices may be included such as input devices (keyboards, mice, joystick, etc.), output devices (monitor screens, printers, etc.) Although three projectors are shown in the example configuration of FIG. 1, it will be appreciated that a very large multi-projector system may include hundreds of such projectors.

Figure 2:
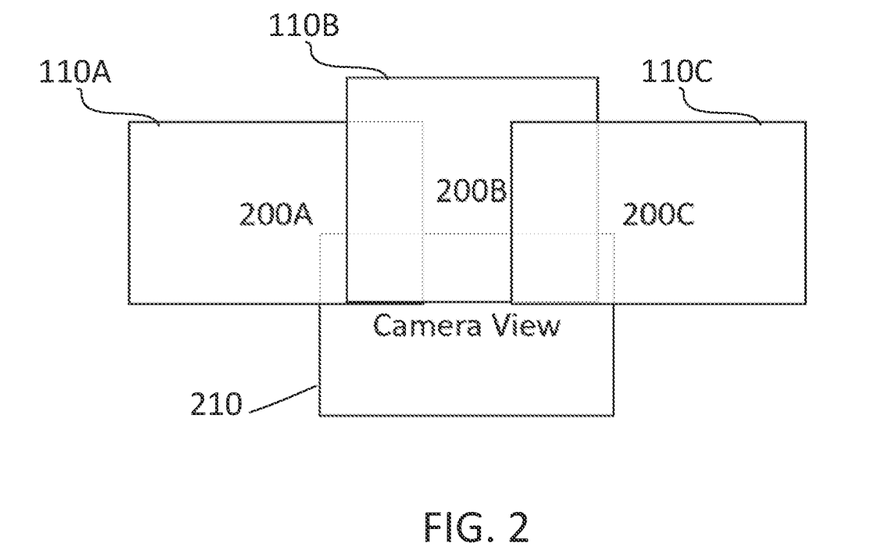
FIG. 2 shows a plurality of images with overlapping portions projected using the system of FIG. 1 for capture by a camera.

When configured in a cluster, the projectors 110A, 110B, 110C display what is perceived as a single seamless composite image composed of multiple projected images 200A, 200B, 200C on a display surface 140, or other physical objects, as shown in FIG. 2. It should also be noted that the display surface 140 can be any smooth surface or non-contiguous and/or non-smooth surface such as a statue, a castle, or multiple separate objects with spaces between them. The placement of the projectors 110A, 110B, 110C can be casual, that is the boundaries of the images do not have to be aligned.

At least one camera 130A is provided having a field of view 210 that captures the projected images, as shown in FIG. 2. According to an aspect, a parallel gathering method is provided for gathering the structured light patterns 200A, 200B, 200C concurrently through selective masking of the camera images or other separation of the projector patterns, and decomposition of a layout into a graph colouring problem, as set forth in detail below.

Figure 3A:
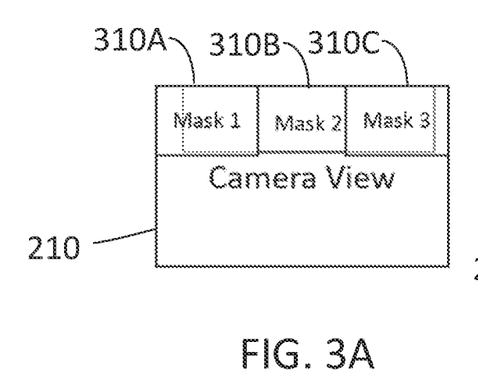
FIGS. 3A-3C show the use of camera/projector masks for limiting the images projected by each of projectors of the system in FIG. 1 to portions that do not overlap with images projected by other ones of the projectors.
Figure 3B:
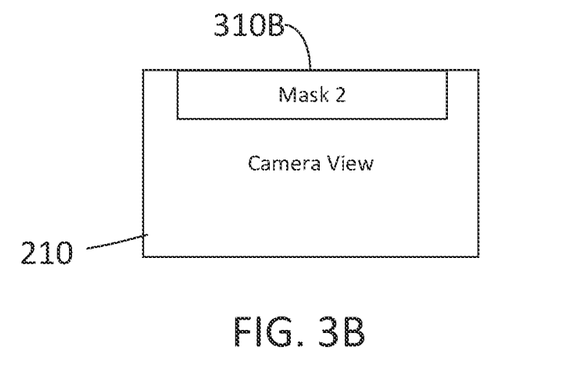
Figure 3C:
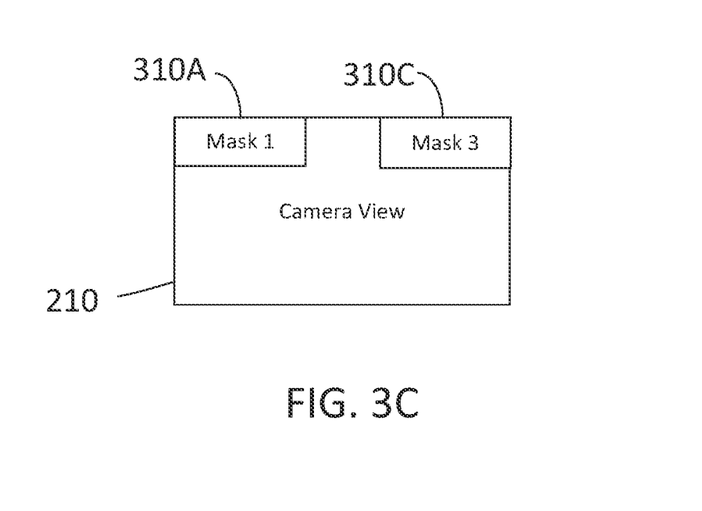

Determining which projectors overlap can be done in a number of ways: In one approach, each projector 110A, 110B, 110C, etc. is selectively turned on/off to determine where the projection is seen by the camera(s) to create a list of camera/projector masks 310A, 310B, 310C, etc., as shown in FIG. 3A. Alternatively, additional available information—such as design information (plans for where projection was meant to land) or results from previous calibrations can be used to estimate and build camera/projector masks. it should be noted that masks need not be perfectly accurate—they can be conservative in their estimates, denoting areas where a projector might project. By using a pixel mask per projector, per camera, and/or different colors or patterns per projector, pixels belonging to different projectors can be sensed in a single camera image (i.e. camera view 210), even if the exact projector pixel identity is uncertain. For example, in FIG. 3B, mask 310B is selected to isolate structured light patterns 200A and 200C, while in FIG. 3C masks 310A and 310C is selected to isolate structured light pattern 200B. Projector images can thus be gathered simultaneously with a single camera 130A, as long as they do not conflict. The single image from the camera view 210 can then be used for multiple different projector decoding pipelines. Graphs of projector conflicts are divided into gather groups by means of any suitable graph colouring algorithm, such as an algorithm based on order of node connectivity, though greedy and heuristic algorithms can also be used, as discussed below.

Figure 3D:
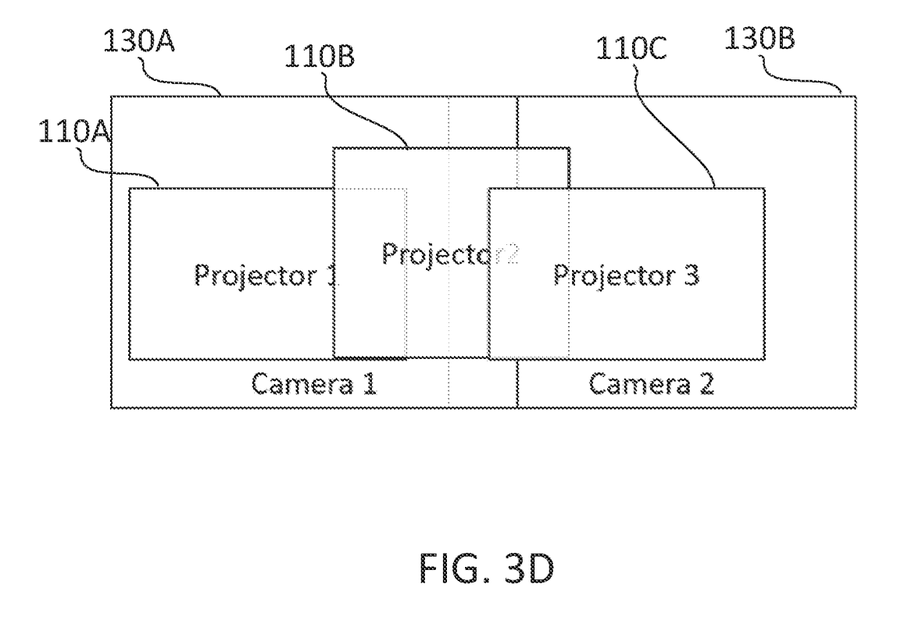
FIG. 3D shows the use of two cameras to gather structured light patterns from two gather groups, using the camera/projector masks.

In other embodiments, additional cameras may be included, such as camera 130B in FIG. 1. Provided the projector images do not conflict they can be simultaneously gathered using both cameras 130A and 130B. For example, FIG. 3D shows the use of two cameras to gather structured light patterns from two gather groups, using masks as discussed above with reference to FIGS. 3A-3C.

Figure 4:
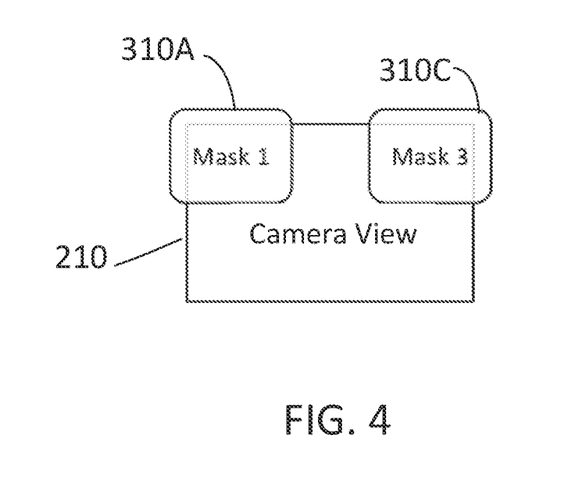
FIG. 4 shows mask enlargement to accommodate for camera and/or projector movement between different calibration runs, according to an aspect.

In some embodiments, masks 310A, 310B, 310C can be enlarged to accommodate for small changes in projection between different calibration runs, as shown in FIG. 4.

Figure 5A:
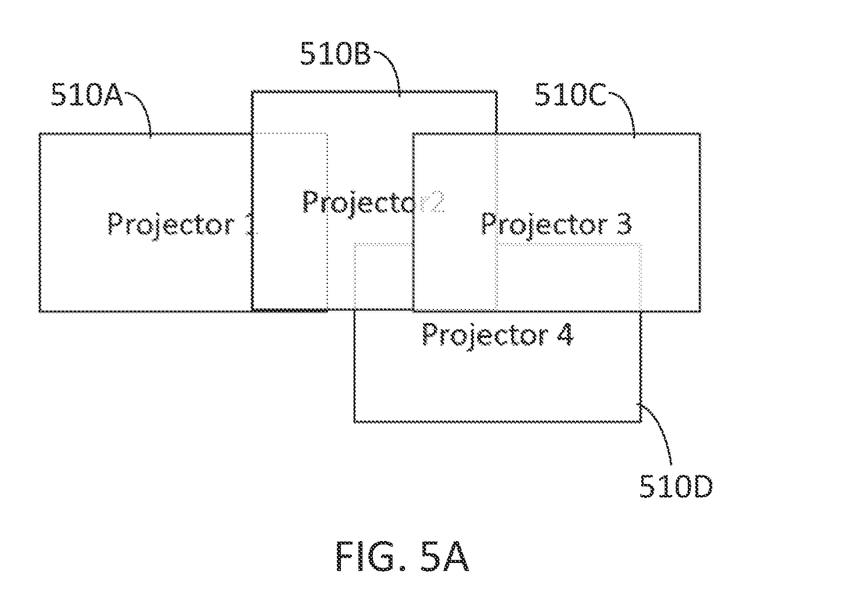
FIGS. 5A and 5B show an example layout of four projector images with overlaps arranged into three gather groups.
Figure 5B:
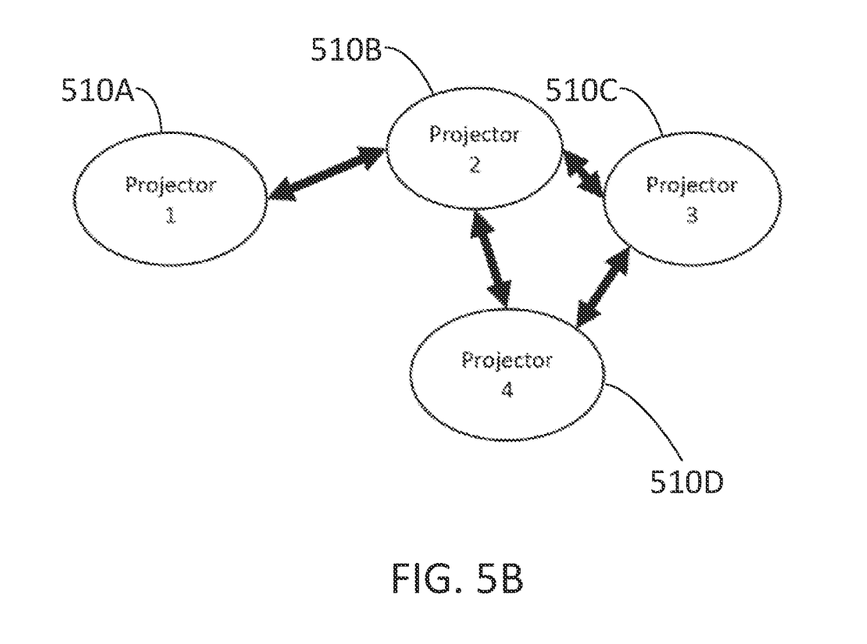

According to the method set forth herein, non-overlapping images from multiple projectors can be gathered simultaneously by one or more cameras. Moreover, the numerical limit to the number of projectors whose images can be simultaneously gathered is the number of projector image conflicts. Thus, as shown in the example of FIGS. 5A and 5B, four projector images 510A, 510B, 510C and 510D conflict to form three gather group (510A+510C, 510B and 510D), where the double arrows in the graph of nodes diagram of FIG. 5B represent projector image conflicts.

Figure 6A:
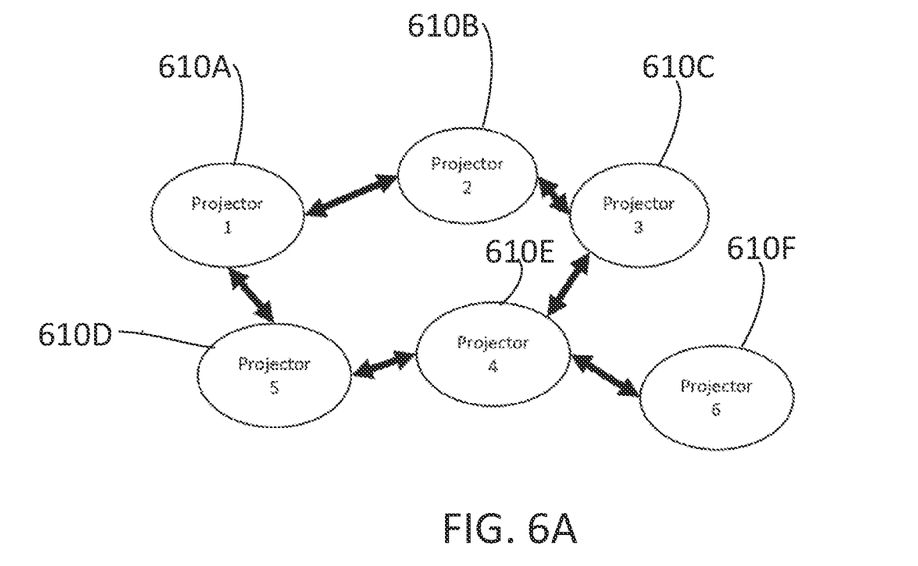
FIGS. 6A and 6B show an example layout of six projectors with conflicts arranged into three gather groups.
Figure 6B:
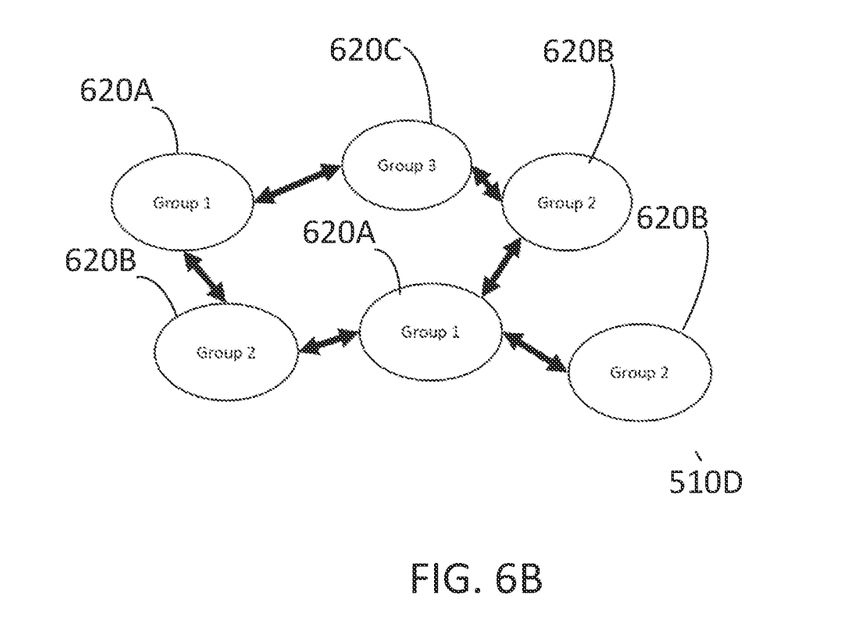

In any projector layout of connected nodes representing projector image conflicts, the minimum gather time is given by the fewest number of gather groups. Thus, for the example of FIGS. 6A and 6B, a layout of six projectors 610A, 610B, 610C, 610D, 610E and 610F can be arranged into three gather groups 620A, 620B, 610C, where non-conflicting projectors are grouped as group 1 (620A)=projectors 610A and 610E, group 2 (620B)=projectors 610C, 610D and 610F and group 3 (610C)=projector 610B. As in the graph of nodes diagram of FIG. 5B, the double arrows in FIGS. 6A and 6B represent projector image conflicts.

Figure 7:
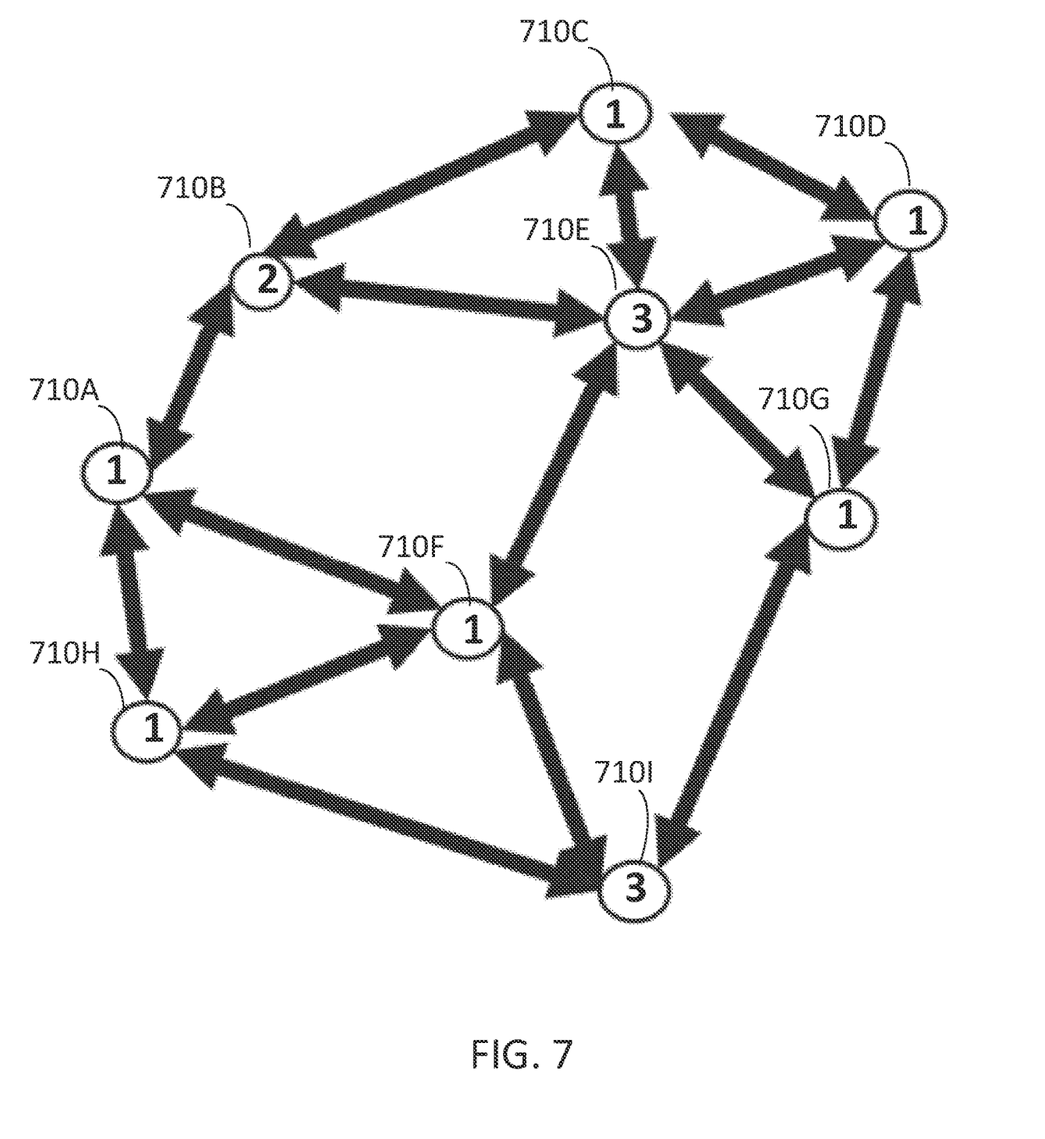
FIG. 7 shows an example of a complex layout of nine projectors with overlaps arranged into three gather groups.

Indeed, complex arrangements of multiple projectors can be grouped according to projector conflicts to minimize the gather time for a multi-projector system. For example, in FIG. 7, a complex layout of nine projectors (710A, 710B, 710C, 710D, 710E, 710F, 710G, 719H, 710I) can be organized into three non-conflicting groups of projectors (groups 1, 2, 3 as indicated in the circles representing each projector).

Since the total gather time is limited by mutual projector conflict, a layout of N conflicting projectors (known as a clique) will require >=N groups. For example, a two-dimensional array of tiled projectors will require four or fewer gather groups, regardless of the array size. For example, the 4×6 array of projectors shown in FIG. 8, can be reduced to four non-overlapping gather groups (Group 1, Group 2, Group 3 and Group 4), because projector 1,1 overlaps only with projectors 1,2 and 2,1 while projector 1,2 only overlaps with projectors 1,3 and 2,2, etc.

Figure 9:
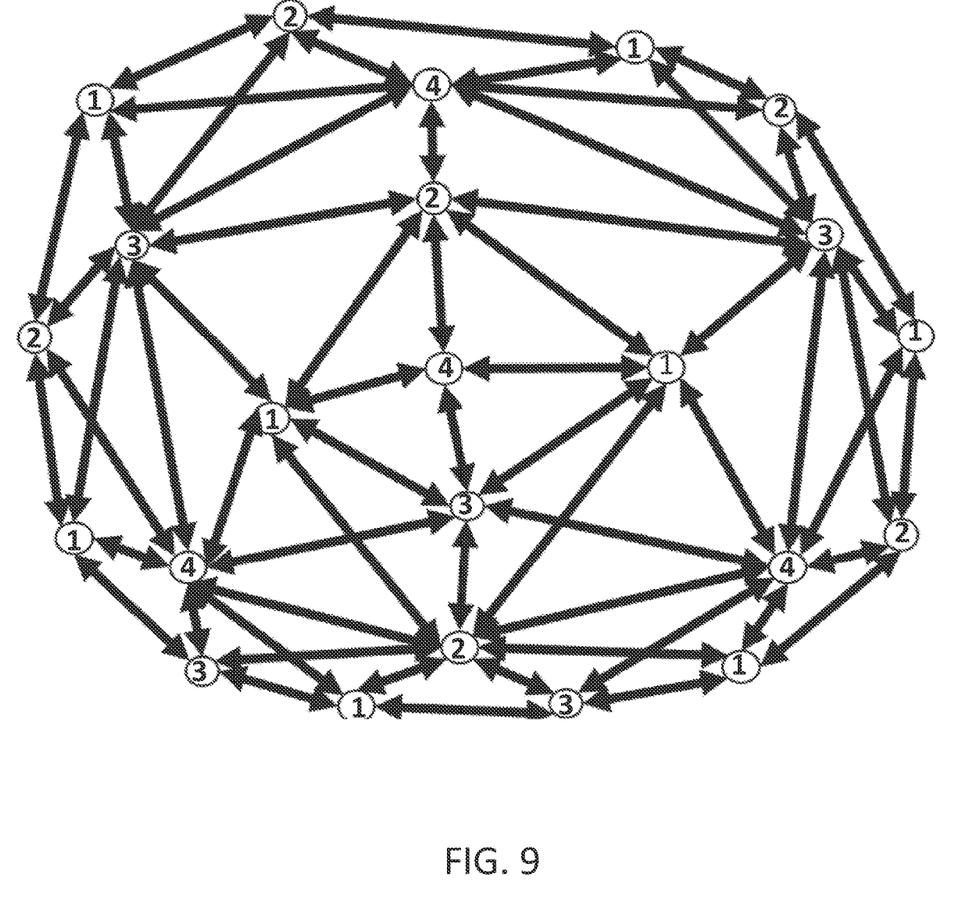
FIG. 9 shows a large dome display of multiple projectors with overlap arranged into four gather groups.

Similarly, a large dome display also requires only four or fewer gather groups, as shown in FIG. 9.

Figure 10:
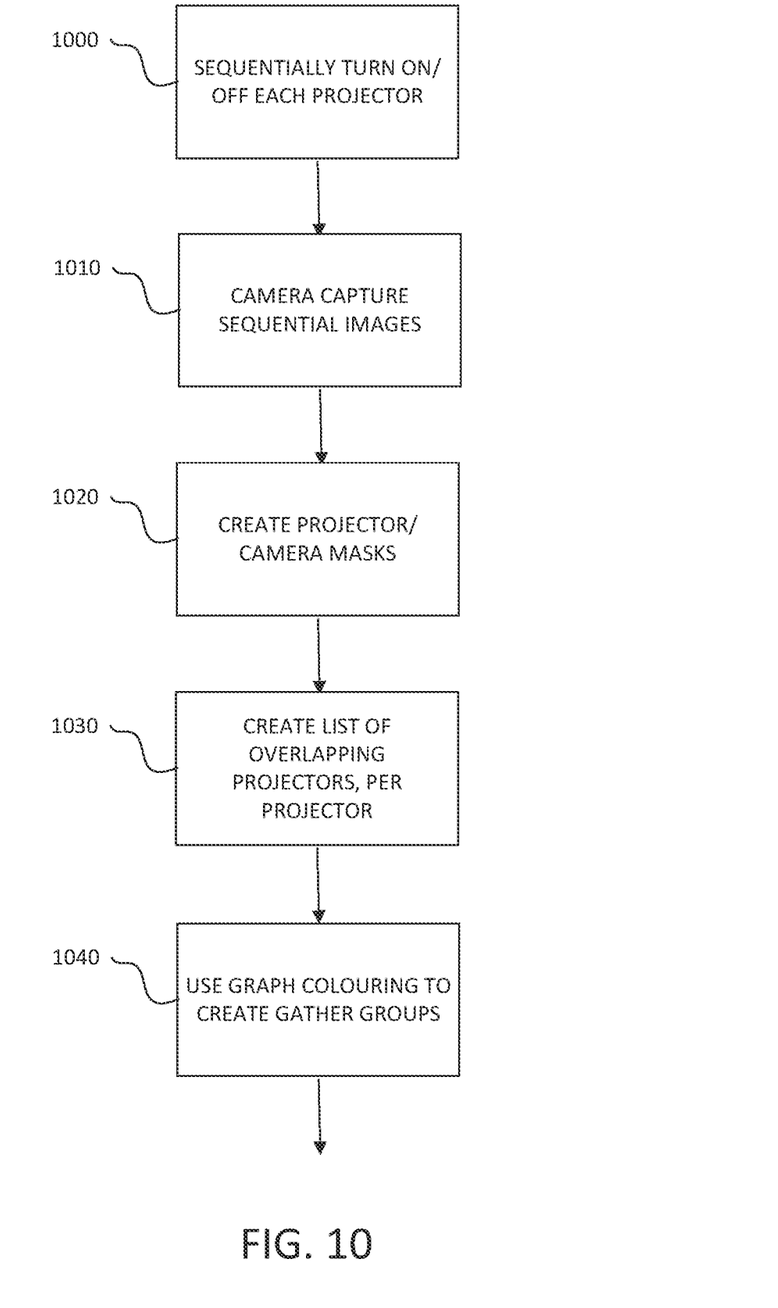
FIG. 10 is a flowchart showing steps in a method of parallel gathering of structured light patterns in multi-projector systems, according to an aspect of this specification.

Turning now to FIG. 10, steps are set forth for a method of parallel gathering of structured light patterns in multi-projector systems, according to an embodiment. The method utilizes graph colouring, which is a type of graph labeling algorithm by which nodes of projectors (referred to as "colours") are assigned to the nodes of a graph subject to certain constraints. In its simplest form, graph colouring is a way of coloring the vertices of a graph such that no two adjacent vertices are of the same color (referred to as vertex colouring).

Figure 8:
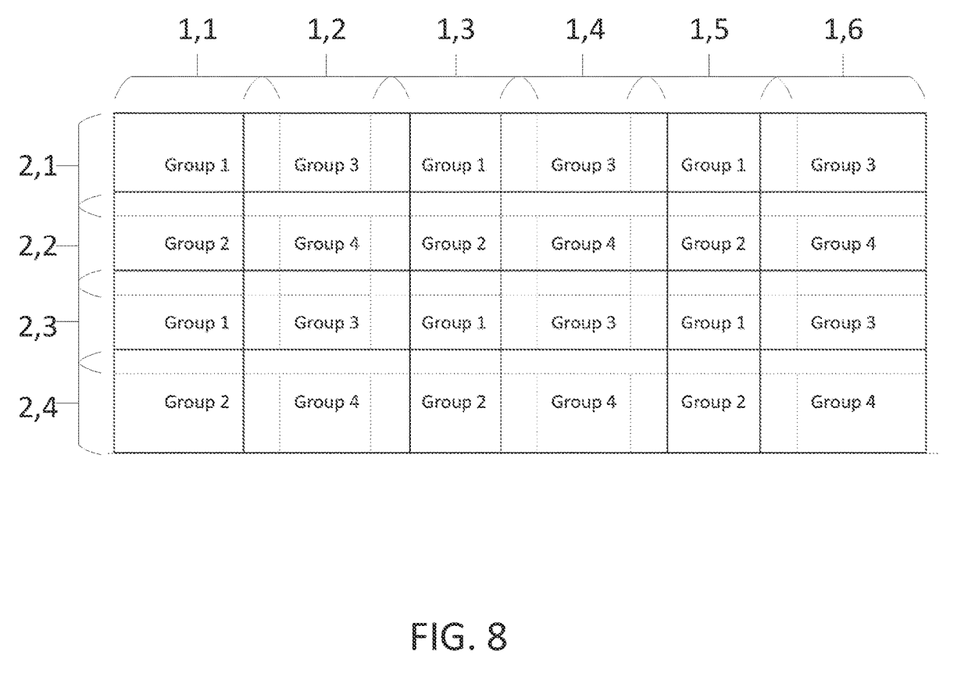
FIG. 8 shows a two-dimensional array of tiled projectors with overlaps arranged into four gather groups.

At 1000, processor 150 causes projectors 110A, 110B, 110C, etc. of a multi-projector system 100 to sequentially turn on/off. The sequential images are captured at 1010 by associated cameras, such as cameras 130A and 130B and collected within processor 150 which, at 1020 creates projector/camera masks, such as masks 310, 310B, 310C, etc. As discussed above, steps 1000 and 1010 may be replaced by other steps based on a priori knowledge of where images from each of the projectors will be projected on the surface and a priori knowledge of the relationship between the at least one camera and the surface. At 1030, for each projector, processor 150 then uses the masks to create a graph of other projectors that conflict, such as shown in FIGS. 5A and 8. Projectors are marked as conflicting when their projections, as seen from one or more cameras, overlap in the camera images, and the projections cannot be disambiguated by the projected patterns shape, color, timing, etc. Conflicting projectors are marked as "connected" with each other. The connections (and lack thereof) between all the projections form a graph, with each projector being a node/vertex of the graph, and each connection/conflict an edge of the graph.

Since the time it takes to gather from each projector may differ depending on model/resolution/pattern/etc., knowledge of the relative projector gather times can be used to modify the graph (e.g. to group projectors with similar speeds together).

The list can be created based on camera/projector and projector/projector conflicts, an example of which is shown in Tables 1 and 2:

TABLE 1

|  | Proj 1 | Proj 2 | Proj 3 | Proj 4 |
|---|---|---|---|---|
| Cam 1 | X | X |  |  |
| Cam 2 |  |  | X |  |
| Cam 3 |  |  | X | X |
| Cam 4 | X | X | X |  |

TABLE 2

|  | Proj 1 | Proj 2 | Proj 3 | Proj 4 |
|---|---|---|---|---|
| Proj 1 |  |  | X | X |
| Proj 2 | X |  |  | X |
| Proj 3 | X |  |  | X |
| Proj 4 |  | X | X |  |

Based on the lists created at 1030, at 1040 processor 150 uses a graph colouring algorithm, for example, to create gather groups for simultaneous image gathering. A number of graph colouring algorithms and data structures are known in the art that can be used to create the gather groups at 1040. For example, a greedy algorithm can be used whereby vertices (i.e. nodes) of the projector graph, as shown in FIGS. 5B, 6A, 6B, 7 and 9, are considered in a specific order, such as $v_1, \ldots, v_{n1}$, where $v_i$ is assigned the smallest available colour (i.e. gather group) not used by $v_i$'s neighbour nodes among $v_1, \ldots, v_{n-1}$, and adding a fresh colour (group) if needed. Another approach uses graph decomposition wherein a node having highest connectivity (conflict) is selected and assigned to a first gather group. Processor 150 then searches for a node that is two projectors away and if there is no conflict, assigns it to the same gather group, etc. A brute-force algorithm may also be used for small numbers of projectors wherein processor 150 determines each $k^{th}$ assignment of k colours applied to n vertices and checks for each if it is legal. Finally, at 1050, images are gathered by the cameras (e.g. cameras 130A and 130B) from the projectors of each gather group.

The present invention has been described with respect to the exemplary embodiments above. A person or ordinary skill in the art may conceive of other modifications and variations that are intended to be covered by the appended claims. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of parallel gathering of projected images on a surface in a multi-projector system having a plurality of projectors, comprising:
    creating one or more masks for limiting capture by at least one sensing device of the projected images by each of the plurality of projectors to portions that do not overlap with projected images by other ones of the plurality of projectors;
    using the one or more masks to determine a graph of the plurality of projectors whose images conflict, wherein the projector images are determined as conflicting when they overlap in images captured by the at least one sensing device, wherein each projector is a node of the graph and wherein each conflict is an edge of the graph;
    creating from the graph a plurality of gather groups of projectors whose images do not conflict using a graph colouring algorithm;
    modifying the graph using a priori knowledge of relative projector gathering times such that projectors with similar gathering times are grouped in the same gather group; and
    simultaneously gathering images from projectors in each of the gather groups by the at least one sensing device.

2. The method of claim 1, wherein the graph colouring algorithm includes at least one of a brute-force algorithm, an algorithm based on order of node connectivity, a greedy algorithm and a heuristic algorithm.

3. The method of claim 1, wherein images from the plurality of projectors are projected on a flat surface.

4. The method of claim 1, wherein images from the plurality of projectors are projected on a smooth surface.

5. The method of claim 1, wherein the smooth surface comprises non-contiguous portions.

6. The method of claim 1, wherein images from the plurality of projectors are projected on a non-contiguous and/or non-smooth surface.

7. The method of claim 1, wherein the images are structured light patterns.

8. The method of claim 1, wherein the graph is determined by capturing projected images on the surface via at least one camera.

9. The method of claim 8, further comprising separating a single camera image into an image per projector based on said masks.

10. The method of claim 1, wherein the the priori knowledge includes projection design parameters.

11. The method of claim 1, wherein the priori knowledge includes known channel extent relationships between the plurality of projectors and the surface in the channel of the multi-projector system.

12. The method of claim 1, wherein the graph is determined via previous iterations of the method.

* * * * *